United States Patent [19]

Werner

[11] 4,229,041

[45] Oct. 21, 1980

[54] ANCHORING ARRANGEMENT FOR SAFETY BELTS IN A MOTOR VEHICLE

[75] Inventor: Paul Werner, Remscheid, Fed. Rep. of Germany

[73] Assignee: Keiper Automobiltechnik GmbH & Co. KG, Remscheid-Hasten, Fed. Rep. of Germany

[21] Appl. No.: 4,310

[22] Filed: Jan. 17, 1979

[30] Foreign Application Priority Data

Jan. 21, 1978 [DE] Fed. Rep. of Germany ....... 2802616

[51] Int. Cl.² ............................................. A62B 35/00
[52] U.S. Cl. ................................. 297/468; 248/393; 297/216
[58] Field of Search ............... 297/385, 389, 216, 468, 297/483; 280/744, 747; 248/393, 394, 395, 429, 430; 24/206 B, 265 BC

[56] References Cited

U.S. PATENT DOCUMENTS

| | | | |
|---|---|---|---|
| 3,746,393 | 7/1973 | Andres et al. | 297/385 |
| 3,845,987 | 11/1974 | Bashford | 297/385 |
| 3,866,876 | 2/1975 | Adams | 297/385 |
| 3,977,725 | 8/1976 | Tengler et al. | 297/385 |
| 4,042,276 | 8/1977 | Breitshwerdt | 297/216 |

FOREIGN PATENT DOCUMENTS

| | | | |
|---|---|---|---|
| 1152907 | 8/1963 | Fed. Rep. of Germany | 297/468 |
| 2141147 | 3/1973 | Fed. Rep. of Germany | 297/468 |
| 2106960 | 4/1972 | France | 297/468 |

*Primary Examiner*—James T. McCall
*Attorney, Agent, or Firm*—Michael J. Striker

[57] ABSTRACT

The anchoring arrangement for safety belts connected to a vertically and longitudinally displaceable vehicle seat comprises a clamping arm connected to the longitudinally adjustable guide rail and projecting toward the seat frame, a clamping lever pivotably connected to the seat frame and having one arm connected to the safety belt. The other arm of the clamping lever is provided with guiding pins slidably engaging two opposite narrow sides of the clamping arm in such a manner as to allow vertical adjustment of the seat but as to clamp the clamping arm if an excessive force is applied against the safety belt.

7 Claims, 3 Drawing Figures

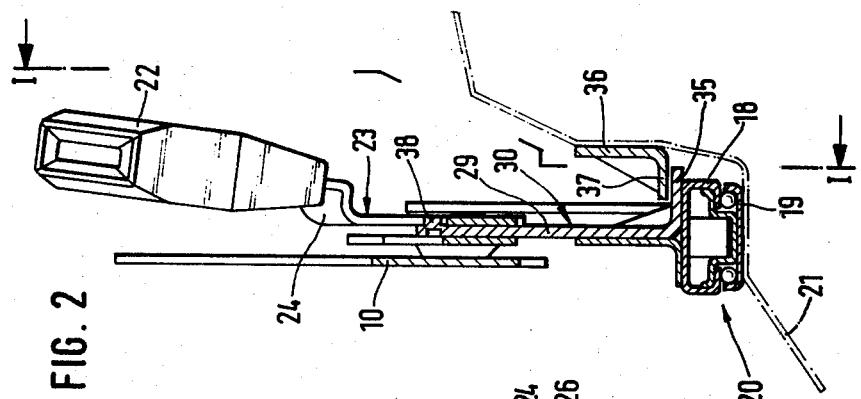
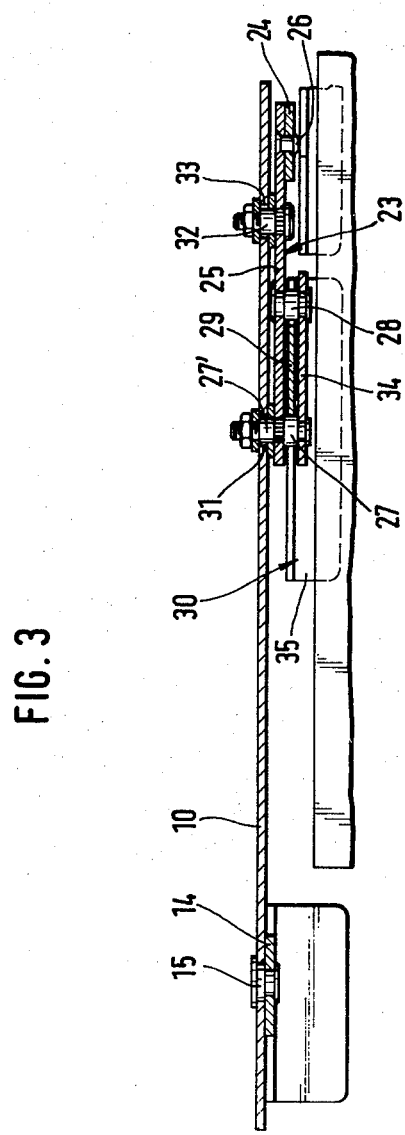
FIG. 2
FIG. 3

ANCHORING ARRANGEMENT FOR SAFETY BELTS IN A MOTOR VEHICLE

BACKGROUND OF THE INVENTION

This invention relates to an anchoring arrangement for safety belt buckles in vehicles, especially for safety belts encircling vertically adjustable seats of a motor vehicle. The vertical position adjuster for the seat is of the type which includes a clamping lever which is pivotably connected to the supporting frame for the vehicle seat, and a supporting beam secured to the vehicle body and having a clamping arm engaging the clamping lever in such a manner that during the vertical position adjustment of the seat the lever arm slides on the clamping arm and in the case of a collision the lever automatically becomes arrested thereon.

In conventional anchoring arrangements for adjusters of the above-described type the clamping lever is made in the form of an angular lever and pivotably supported on the frame of the vehicle seat. The seat frame is supported for longitudinal movement on two pairs of guiding rails and can be inclined at different angles relative to the floor of the vehicle. The belt buckle is pivotably supported for a limited angular movement on one end of the angular clamping lever whereas the other end of the clamping lever is shaped into a fork-like member which overlaps in the fashion of a guiding socket a supporting rail of which is pivotably attached to the body of the vehicle and which is provided on its lower side with a locking rack covered with a lining. The rack cooperates with a locking tooth provided at the free end of the fork-like portion of the clamping lever. This locking tooth is preferably in the form of a bolt which is rigidly connected to the fork-like guiding receptacle. The aforementioned arrangement of the two pairs of guiding rails which support the seat frame makes it possible that during a longitudinal adjustment of the seat, the seat frame is slightly angularly displaced and thus lifted or lowered. The belt buckle can take part in this angular movement of the seat frame since the clamping lever connected to the frame is longitudinally displaceable on the supporting rail, the latter being pivotable about a fixed pivot point on the vehicle body thus permitting a vertical displacement of the clamping lever. Accordingly the buckle on the safety belt maintains its fixed position relative to the seat irrespective of its adjustment. In the event of a collision the pulling force acting against the belt buckle turns the clamping lever in such a manner that the bolt acting as the arresting tooth penetrates the lining which is preferably made of a pliable plastic and engages the arresting teeth of the rack on the supporting rail. As a result, the pulling force from the belt buckle is transmitted via the clamping lever and the supporting rail into the vehicle body. In case of a collision the safety belt with its bucke performs, however, a forward movement because of the pivotal movement which is necessary for engaging the locking tooth of the clamping lever, and consequently the loop size of the safety belt increases. In addition during a collision the supporting rail swings upwardly until the line of action of the pulling force is aligned with the pivot point of the supporting rail on the vehicle body. As a consequence the loop of the safety belt is additionally increased so that the danger of injury to the user of the vehicle is also increased.

SUMMARY OF THE INVENTION

The object of this invention is, therefore, to provide an improved anchoring arrangement for safety belts which is not possessed of the above-described disadvantages.

An additional object of the invention is to provide such an improved anchoring arrangement in which the pulling force of the safety belt occuring in the case of a collision is transmitted to the body of the vehicle without a noticeable increase in the size of the belt loop resulting from the arresting movement of component parts of the anchoring arrangement.

A further object of the invention is to provide such an improved anchoring mechanism which permits a fixed position of the belt buckle relative to the vehicle seat during the position adjustment of the latter.

In keeping with these objects and others which will become apparent hereafter, one feature of the invention resides in a combination in which the supporting member which is pivotably connected to the vertically adjustable seat frame is coupled to the longitudinally displaceable tracks of a guiding rail arrangement whereby the clamping arm projecting from the support engages the clamping mechanism of the vertical adjuster of the seat. In this manner it is insured that the buckle of the safety belt maintains its fixed position relative to the seat frame during its longitudinal adjustment as well as during its vertical adjustment. The angular clamping lever of the vertical adjuster has its free arm connected to the belt buckle so that the pulling force exerted against the safety belt during a collision locks the other arm of the clamping lever against the clamping arm of the support all the more strongly the larger is the pulling force. The pulling force can be transmitted via a corresponding footing of the support member into the movable guiding rail of the guide rail arrangement over an increased longitudinal range so that due to a plurality of mounting points of the rail arrangement at the floor of the vehicle, the transmission of the pulling force to a single point only at the vehicle body is prevented. For this reason, there is no need to reinforce the fastening points of the anchoring arrangement in order to prevent the tearing up of the attachment points from the vehicle body in the event of a collision.

In order to achieve a simple vertical position adjustment or angular position adjustment of the seat frame during its longitudinal position adjustment, the clamping arm projecting from the seat frame supporting member has, according to another feature of this invention, an arcuate shape corresponding to the curved path of movement of the seat frame about its pivot point on the guide rail.

According to a further feature of this invention the clamping arm of the support member has its narrow sides in engagement with clamping pins connected to the clamping lever of the seat position adjuster. The end portion of the clamping pins assigned to respective narrow sides of the clamping arm project laterally above the outer broad side of the clamping arm and are interconnected by a connecting strap. This connecting strap insures a stable structure of the anchoring arrangement of this invention without the need for reinforcing its component parts.

In order to avoid bending of the supporting guide rail assembly when excessive pulling forces act against the safety belt, and to insure a reliable holding in position of the supporting arm relative to the clamping lever in the event of a collision, the supporting member in the anchoring arrangement of this invention has an angular footing which projects under a safety shoulder which is fixedly connected to the vehicle body and which extends parallel to the guide rail of the longitudinal adjuster so that the footing is slidably displaceable with a small play below the safety shoulder. Preferably, the safety shoulder is a component part of an angular track fixedly mounted to the vehicle body and extending in the range of the longitudinal movement of the vehicle seat.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a sectional front view of the arrangement of FIG. 1 taken along line II—II; and FIG. 3 is a sectional top view of the arrangement of FIG. 1 taken along line III—III.

DESCRIPTION OF THE PREFERRED EMBODIMENTS

Figure 1:
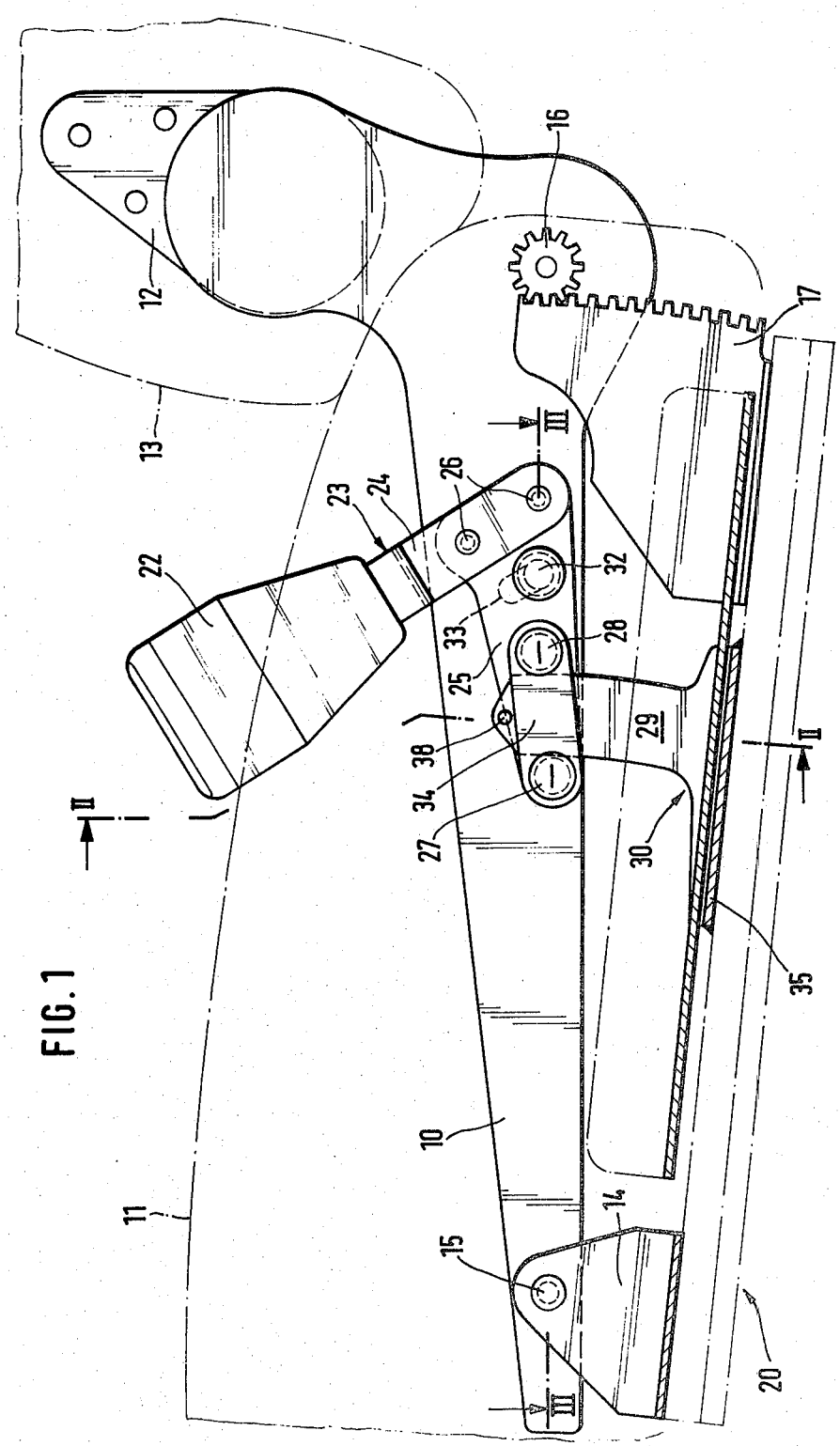
FIG. 1 is a side view, partly in section, of the anchoring arrangement for a safety belt buckle attached to a clamping lever which is pivotably connected to a vertically adjustable frame of a vehicle seat.

In the embodiment illustrated in the drawings, the vertically adjustable seat frame 10 is formed by two lower hinge parts secured to respective lateral sides of the seat 11 and being hinged to an upper hinge part 12 secured to the backrest 13 of the seat. The angular position of backrest 13 is adjusted by means of a conventional wobble gear arrangement provided between the upper hinge part 12 and the seat frame 10. This wobble gear adjusting mechanism is known from the prior art and need not be described in detail. The front part of seat frame 10 is pivotably supported in bearing brackets 14 by means of pivot pins 15. The rear side walls of frame 10 rotatably support pinions 16 which are arranged respectively on each side of seat 11 and which engage gear segments 17 provided at the rear portion of runway or movable guide rails 18 of guide rail assembly 20. The bearing brackets 14 are attached, respectively, to the front portion of rails 18. The base rails 19 of the guide rail assembly 20 are fixed to the vehicle body 21. Seat frame 10 can be vertically adjusted by means of a non-illustrated position adjusting drive which is in mesh with both pinions 16 and driven either manually or by means of a motor to cause a vertical displacement of pinions 16 along gear segment 17, thus pivoting frame 10 about the pivot pins 15. In addition, the seat frame together with the vertical position adjuster is longitudinally displaceable in the guide rail assembly 20.

The belt buckle 22 is fixed to the free end of the upwardly projecting arm of clamping lever 23 which in turn is pivotably supported on one side of the lower hinge part of the seat frame 10, preferably in the central part of the vehicle so that the belt buckle 22 remains in a fixed position relative to the adjustable seat 11 and follows each position adjustment of the latter. The arms of clamping lever 23 are formed by an upwardly directed buckle supporting strap 24 and by a horizontally directed clamping strap 25, both straps being firmly riveted to each other by rivets 26 to form an angular configuration of the lever. The horizontally directed clamping strap 25 of clamping lever 23 fixedly supports two clamping pins 27 and 28 arranged one behind the other and spaced about a distance corresponding to the width of a flat clamping arm 29 connected via its support 30 to the movable guide rail 18. The front clamping pin 27 projects from both sides of the clamping strap 25, whereas the rear clamping pin 28 projects unilaterally from the outer side of clamping strap 25. The opposite narrow sides of clamping arm 29 are in sliding contact with the projecting parts of the clamping pins 27 and 28. The inwardly projecting part of clamping pin 27 is pivotably supported in a boring 31 in frame 10 to form a pivot axle 27' for the clamping lever 23. The narrow sides of clamping arm 29 which are in slidable contact with clamping pins 27 and 28 have an arcuate shape, the radius of curvature of which corresponding to the distance between respective narrow sides and the pivot axle 15 of seat frame 10. The clamping strap 25 of clamping lever 23 further fixedly supports a guiding bolt 32 which projects into an arcuate oblong hole 33 in the seat frame 10. The radius of curvature of the guiding hole 33 corresponds to its distance from the pivot axle 27'. Clamping pinion 27 as well as the guiding bolt 32 support, respectively, spacing washers arranged at both sides of the assigned lower hinge part of seat frame 10 and the inwardly projecting portions of clamping pin 27 and of guiding bolt 32 are threaded and secured to the seat frame by means of a nut, for example. In this manner, clamping lever 23 is held in a well-defined position relative to the outer wall of seat frame 10. The outwardly projecting ends of clamping pins 27 and 28 are interconnected by means of reinforcing strap 34 bridging the outer broad side of the arm 29 and extending parallel to the outer wall of seat frame 10 to prevent the bending of clamping pins 27 and 28 when the latter are exposed to clamping forces.

Normally, a certain play is left between clamping pins 27 and 28 and the facing narrow sides of clamping arm 29 so that clamping lever 23 due to its own weight normally rests with its guiding bolt 32 on the lower end of guiding groove 33. In this rest position of guiding bolt 32 the clamping lever 23, and thus the belt buckle 22 connected thereto, can follow the position adjusting lifting and lowering movement of seat frame 10. It is, therefore, possible to achieve under normal circumstances an unobstructed adjustment of the seat 11 relative to the guide assembly 20 without bringing the clamping pins 27 and 28 of arm 23 into clamping engagement with the arm 29. Only upon the occurrence of an excessive pulling force acting against the safety belt buckle 22 will the clamping lever be pivoted upwardly about its pivot axis 27' and due to this pivotal movement both clamping pins 27 and 28 are locked against the narrow sides of clamping arm 29 of support 30. As a result the pulling force is transmitted from belt buckle 22 into the support 30 and therefrom via its footing 35 into the guide rail 18. The footing 35 has also an angular cross-section and overlaps the guide rail 18 toward the wall of a tunnel-like recess in the body 21 of the vehicle, as indicated by dash-dot lines in FIG. 2. In the range of this recess is also fixedly mounted an angular rail 36 which has a shoulder 37 extending parallel to the guide rail 18 and overlapping with a small play the footing 35 of support 30. In the case of a collision the excessive pulling force acting against the belt buckle 22 causes a minute deformation of the guide rail arrangement 20 which makes the footing 35 of support 30 to abut against the safety shoulder 37 so that a reliable reinforcement of the anchoring mechanism of this invention on the vehicle body 21 takes place. In this manner it is insured that the loop size of the safety belt in the case of an accident remains practically unchanged.

To prevent an inuntentional withdrawal of clamping lever 23 from clamping arm 29 of support 30, the upper end of clamping arm 29 is provided with a projection 38 overlapping strap 34 and acting as a limit stop for the lever 23.

It will be understood that each of the elements described above, or two or more together, may also find a useful application in other types of constructions differing from the types described above.

While the invention has been illustrated and described as embodied in a preferred example of the anchoring mechanism, it is not intended to be limited to the details shown, since various modifications and structural changes may be made without departing in any way from the spirit of the present invention. For example, clamping lever 23 instead of guiding bolt 32 and of oblong holes 33 in seat frame 10 can be formed to include deformable guiding means which would perform their function only during the normal seat adjusting process whereas in the case of a collision they would become deformed. Moreover, the arcuate shape of the clamping arm 29 of pin 30 can be omitted provided that the vertical position adjuster for the seat moves the latter perpendicularly to the guide rail arrangement.

Without further analysis, the foregoing will so fully reveal the gist of the present invention that others applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an anchoring arrangement for a safety belt of an adjustable vehicle seat having a seat frame, a guide rail assembly secured to the vehicle body and incuding a longitudinally adjustable guide rail and a vertical adjuster provided between the guide rail and the seat frame, a combination comprising a support member secured to said longitudinally adjustable guide rail and including a clamping arm projecting upwardly to said seat frame; a clamping lever pivotably connected to said seat frame and having one arm secured to the safety belt, the other arm of said lever supporting clamping means normally slidably engaging two opposite sides of said clamping arm and being adapted for locking the clamping lever to the clamping arm when an excessive force is applied to the safety belt.

2. The combination as defined in claim 1, wherein said seat frame is pivotably connected to said guide rail and said clamping arm projecting from said guide rail has an arcuate shape matching the path of movement of said seat frame.

3. The combination as defined in claim 1, wherein said clamping means on said other arm of said clamping lever includes two pins slidably engaging two opposite sides of said clamping arm.

4. The combination as defined in claim 3, wherein the free ends of said clamping pins project from at least one broad side of said clamping arm and are interconnected by a reinforcing strap.

5. The combination as defined in claim 1, wherein said support includes an angular footing cooperating with a protective shoulder, said shoulder being attached to the vehicle body and extending parallel to said longitudinally displaceable guide rail and with a minute play above said footing.

6. The combination as defined in claim 5, wherein said protective shoulder is formed by one arm of an angular rail secured to the body of the vehicle.

7. The combination as defined in claim 2, further including a guide bolt secured to said other arm of said clamping lever and projecting into an arcuate oblong hole in said seat frame.

* * * * *